(12) United States Patent
Komarneni et al.

(10) Patent No.: US 11,537,908 B2
(45) Date of Patent: Dec. 27, 2022

(54) DYNAMIC DETERMINATION OF AGENT KNOWLEDGE

(71) Applicant: HUMAN DX, LTD., New York, NY (US)

(72) Inventors: Jayanth Komarneni, New York, NY (US); Irving Lin, San Francisco, CA (US)

(73) Assignee: HUMAN DX, LTD, New York, NY (US)

(*) Notice: Subject to any disclaimer, the term of this patent is extended or adjusted under 35 U.S.C. 154(b) by 362 days.

(21) Appl. No.: 16/715,188

(22) Filed: Dec. 16, 2019

(65) Prior Publication Data

US 2020/0193310 A1 Jun. 18, 2020

Related U.S. Application Data

(60) Provisional application No. 62/780,534, filed on Dec. 17, 2018.

(51) Int. Cl.
*G06N 5/04* (2006.01)
*G06N 20/00* (2019.01)
*G06N 7/00* (2006.01)

(52) U.S. Cl.
CPC .............. *G06N 5/04* (2013.01); *G06N 7/005* (2013.01); *G06N 20/00* (2019.01)

(58) Field of Classification Search
CPC ........... G06N 5/04; G06N 20/00; G06N 7/005
See application file for complete search history.

(56) References Cited

U.S. PATENT DOCUMENTS

| | | | | |
|---|---|---|---|---|
| 5,596,994 | A * | 1/1997 | Bro | ........................ H04M 3/465 600/545 |
| 2016/0092792 | A1 * | 3/2016 | Chandrasekaran | ..... G06F 16/36 706/12 |
| 2018/0053100 | A1 * | 2/2018 | Appel | ..................... G06N 5/022 |
| 2018/0314960 | A1 * | 11/2018 | Martinez Hernandez Magro ....... G16H 50/20 |
| 2019/0138651 | A1 * | 5/2019 | Xiong | ..................... G06N 5/022 |
| 2020/0007474 | A1 * | 1/2020 | Zhang | ................ G09B 19/0053 |

OTHER PUBLICATIONS

Shankar et al., Applying Machine Learning to Product Categorization, (2011) (Year: 2011).*

* cited by examiner

*Primary Examiner* — Brian M Smith
*Assistant Examiner* — Kevin L. Smith
(74) *Attorney, Agent, or Firm* — Buckley, Maschoff & Talwalkar LLC

(57) ABSTRACT

Provided are systems and methods for dynamically determining a discipline-specific knowledge value of an agent. In one example, the method may include receiving from an agent, via a computing device, a formulation of content that corresponds to an inquiry, determining a knowledge value for the agent based on one or more of the content and a property of the inquiry with respect to a dynamically defined solution to the inquiry, and storing the determined knowledge value of the agent within a storage device.

21 Claims, 4 Drawing Sheets

DYNAMIC DETERMINATION OF AGENT KNOWLEDGE

CROSS-REFERENCE TO RELATED APPLICATION(S)

The present application claims priority to U.S. Provisional Patent Application No. 62/780,534, which was filed on Dec. 17, 2018, in the United States Patent and Trademark Office, the entire disclosure of which is hereby incorporated herein for all purposes.

BACKGROUND

Due to the increasing access to and growth of the Internet, new possibilities are emerging into nearly every discipline or specialization of knowledge work, including but not limited to medicine, law, finance, education, manufacturing, government, and the like, which may be further broken down into sub-disciplines and sub-specializations to ever more granular relationships between knowledge sets. People can connect to one another across the world without having to leave the comfort of their home or office, and thus subject matter experts and other knowledgeable agents in various disciplines are more readily available for people with Internet access. This increases the importance of the ability to assess and understand the knowledge of these subject matter experts and other knowledgeable agents.

BRIEF DESCRIPTION OF THE DRAWINGS

Features and advantages of the example embodiments, and the manner in which the same are accomplished, will become more readily apparent with reference to the following detailed description taken in conjunction with the accompanying drawings.

Figure 1:
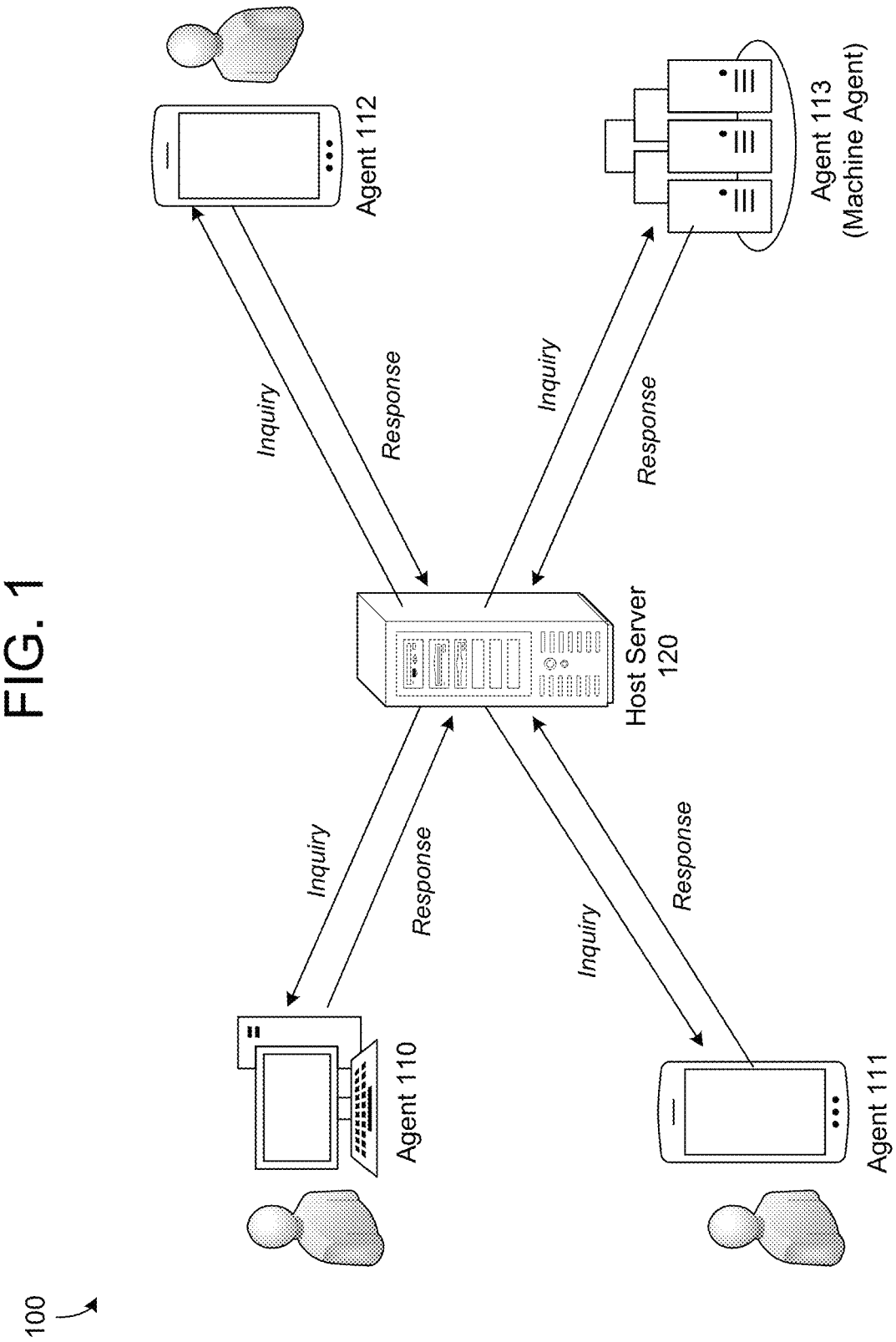
FIG. 1 is a diagram illustrating a knowledge determination network in accordance with an example embodiment.

Throughout the drawings and the detailed description, unless otherwise described, the same drawing reference numerals will be understood to refer to the same elements, features, and structures. The relative size and depiction of these elements may be exaggerated or adjusted for clarity, illustration, and/or convenience.

DETAILED DESCRIPTION

In the following description, specific details are set forth in order to provide a thorough understanding of the various example embodiments. It should be appreciated that various modifications to the embodiments will be readily apparent to those skilled in the art, and the generic principles defined herein may be applied to other embodiments and applications without departing from the spirit and scope of the disclosure. Moreover, in the following description, numerous details are set forth for the purpose of explanation. However, one of ordinary skill in the art should understand that embodiments may be practiced without the use of these specific details. In other instances, well-known structures and processes are not shown or described in order not to obscure the description with unnecessary detail. Thus, the present disclosure is not intended to be limited to the embodiments that is shown but is to be accorded the widest scope consistent with the principles and features disclosed herein.

The example embodiments are directed to a knowledge determining system also referred to herein as a knowledge value or knowledge-based system that can both quantitatively and qualitatively determine a measure of knowledge of an agent in a particular discipline such as medicine, finance, manufacturing, education, and many other fields. As described herein, an agent may refer to an individual or a software program. As another example, an agent may refer to a collective group containing individuals, programs, and/or the like. Thus, it should be appreciated that the term agent may refer to an individual as well as groups of individuals or agents (herein also referred to for simplicity as a single collective agent). Both the system as well as Agents may individually utilize as well as combine their disparate knowledge more effectively by estimating, expanding, synthesizing, and reflecting upon their individual and collective knowledge.

Within each discipline there may be further sub-disciplines. In each sub-discipline, a particular agent may have different knowledge values. The knowledge of a particular agent can be measured based on a reference set of information such as an inquiry, a question, or the like. The reference set may be a hypothetical or sample test case that is designed to elicit descriptive responses rather than just a simple "yes" or "no." As a non-limiting example, the responses may include a diagnosis, a suggested course of action, a treatment or prescription, best practices, an expert recommendation, an answer, and the like. The responses may include descriptive content which may include natural language that can be compared against other responses in natural language as structured or referenced within a relevant ontology of concepts, relationships, attributes, and the like. As another example, responses may also be in the form of a number, media such as images or videos (in any and all formats, e.g., PNG, JPG, GIF, MP4, etc.), and potentially other forms of generalized content responses that could ultimately be labeled and structured through an ontology. Additionally, in circumstances where there is no absolute reference set of information, the responses of other agents enables the system to calibrate the agent's knowledge accordingly and quantitatively (or categorically) on many facets and/or aspects relative to other agents who addressed similar questions.

The system may determine a knowledge value for an agent based on various attributes of the response, both absolutely and relative to the reference set. For example, the agent's knowledge value may be based on both what information (e.g., facts, details, steps, etc.) and how that information (e.g., order, timing, questions asked, etc.) had been obtained as the agent constructs and updates their response(s) to the inquiry. Also, the accuracy (or other attributes, e.g., scope, level, accuracy, precision, efficiency, breadth, depth, etc.) of the agent's responses and/or previous dealings with the system may be used when determining a knowledge value for the agent. Furthermore, responses may be obtained (e.g., read by a program or device, etc.) via hardware and/or software that may or may not be directly provided by the system.

As described herein, a knowledge value is a quantitative or qualitative entity that measures an agent's knowledge set by comparing information it gathers from the agent against an evolving (and often self-evolving) reference set (which may be referred to as an inquiry). An agent's knowledge value is dynamic, and changes with additional information gained on the agent as well as with additional information gained about the reference set. According to various embodiments, the knowledge value captures "who knows what about what." The knowledge value (could be numerical, categorical, or otherwise) may be based on both objective and subjective measures. The system herein can measure the knowledge value of a particular agent or group of agents. Knowledge may be determined for a particular field such as a specific area of expertise, specialty area of the field, discipline, or the like. Furthermore, the knowledge can be measured by the system based on the product of interactions between agents in the system rather than developed by a centralized authority.

FIG. 1 illustrates a knowledge determination network 100 in accordance with an example embodiment. Referring to FIG. 1, the network 100 includes a plurality of agents 110-113 that can be synchronously or asynchronously connected to a host server 120 via a network such as the Internet, a private network, or the like. The agents 110-113 may connect to the host server 120 via programming interfaces or client devices using a web browser, mobile application, or the like. The host server 120 may generate a reference set which is referred to herein as an "inquiry" of information. The inquiry may include one or more questions or other requests for information (e.g., opinion, vote, etc.) about a case within a particular discipline such as medicine, finance, manufacturing, education, and many other fields. The host server 120 may transmit the inquiry to each of the agents 110-113. Here, the agent may be a human, software program running on a computing machine, or some other intelligent being or system. Although the example of FIG. 1 illustrates agents 110-113 connected to the host server 120 via a network, it should also be appreciated that the system may be offline, or may even be done locally with installation of specific software and/or hardware. For example, the testing, the responses, and the knowledge determination may be performed on a same system without needing to be online.

In response to receiving the inquiry, the agents 110-113 generate responses to the inquiry. The host server 120 may read content of the responses, and generate an overall knowledge value, which is composed via a weighting function or learned model using attributes of knowledge, for each agent in association with the inquiry. The host server 120 may include software which can access memory where the weighting function or learning model is stored, and run the weighing function, learning model, etc., based on the response data. A result of the execution of the weighting function or the learning model may include the respective knowledge value. The learning model may be based on attributes that may include the breadth, depth, scope, area, specificity, or other aspects of knowledge that an agent has with respect to a particular topic, discipline, subject matter, etc. The knowledge value may also be a function of one or more various attributes about the agent's response, such as accuracy of the response, how much information needed to be obtained before the response was provided, time to response, how the response was constructed and updated as more information was obtained, data about the agent collected from other sources, other inquiries the agent has responded to about the same discipline, formulation of inquiries by the agent, and the like.

For example, the host server 120 may determine an overall knowledge value for agent 110 based on the content that is read from the responses of the agent 110 and a learned model or weighting function. Here, the host server 120 may smartly combine knowledge values for the agent 110 to determine a current "true" knowledge value as well as a historical timeline of knowledge values. The host server 120 may perform this same determination for each of the different agents 110-113 based on content that is read from their respective responses to create respective knowledge values for the agents 110-113.

Based on the determined knowledge values, the host server 120 may rank the different agents 110-113 for a particular discipline. Furthermore, the host server 120 may output work, orders, requests, queries, incentives, payment, benefits, and the like to one or more of the agent devices 110-113 based on the knowledge value/rating of the agent. Finally, the host server 120 can also request additional inquiries to both have a better gauge of the agent's "true" knowledge value, as well as to identify and subsequently recommend or suggest inquiries to the agent to keep the agent motivated and/or help the agent grow, learn, and expand its own and the system's knowledge. In some embodiments, the host server 120 may combine an agent's knowledge intelligently with that of other agents to achieve intended levels of performance, cost, and/or other attribute(s). For example, when an inquiry requires knowledge of two different disciplines, the host server 120 may combine an agent with knowledge of a first discipline and an agent of knowledge of a second discipline to collaborate intelligently together and improve performance.

Figure 2:
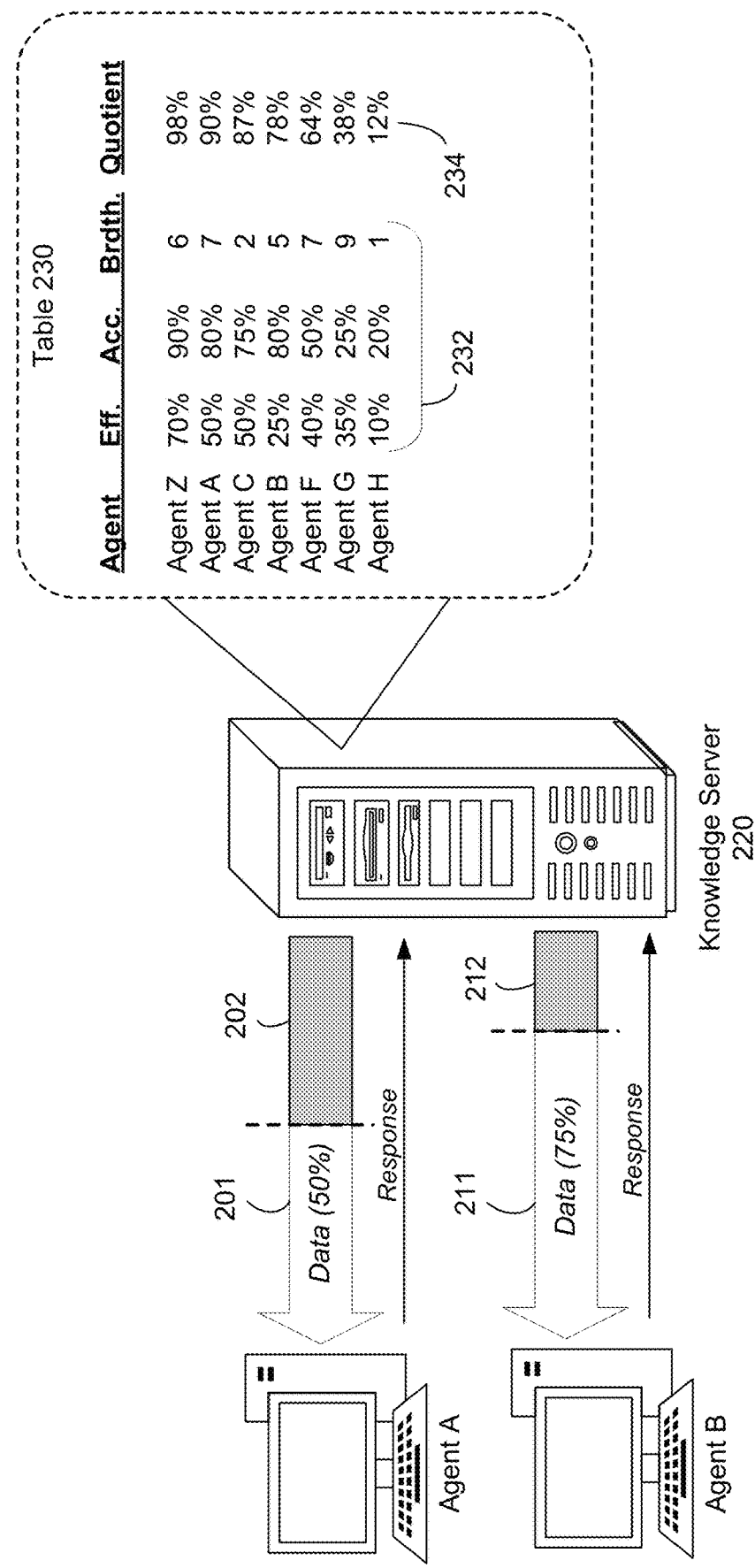
FIG. 2 is a diagram illustrating a process of determining a knowledge value of an agent or agent group in accordance with an example embodiment.

FIG. 2 illustrates a process 200 of determining a knowledge value of an agent in accordance with an example embodiment. Referring to FIG. 2, a knowledge server 220 generates a knowledge value 234 for each of the agents (agent A and agent B) based on various attributes 232 of respective responses provided by the agents and read by the knowledge server 220. In this example, data is revealed (e.g., displayed) by the knowledge server 220 to agent A and agent B in a sequential fashion (note that the sequential fashion is just one manifestation of how data can be revealed) where the data can be algorithmically allocated to the agents by the knowledge server 220. For example, the knowledge server 220 may include a software (e.g., program, application, service, etc.) which controls or otherwise restricts how data of the inquiry is revealed such as through a display screen. For example, the software may control the exposure of data items of the inquiry in a predefined or systematic manner. In some embodiments, a sequence of data items may be revealed where each data item reveals more information about the inquiry, more information about a patient associated with the inquiry, or the like.

In other words, not all data about an inquiry needs to be revealed at once or in a consistent order or before other interactions (for example, how data is revealed may be determined based on the following factors, without limitation: seeing what another agent is considering, seeing the global responses thus far, and/or system-suggested possible responses). For example, if agent A and agent B were providing diagnosis in response to a case on the system, the knowledge server 220 may request a sequential reveal of the symptoms of a patient who is being diagnosed. As another example, if agent A and agent B were providing steps to fix a car in response to a case on the system, different issues with the car may be revealed sequentially. In this example, agent A has received half of the data associated with the inquiry. Therefore, revealed data 201 and unrevealed data 202 are equal. Meanwhile, agent B has received three-fourths of the data. Therefore, revealed data 211 is three times the amount of unrevealed data 212 for agent B. Accordingly, given a sequential reveal process, the knowledge server 220 can determine that agent A has responded more efficiently than agent B.

A knowledge value could also be applied to an agent's construction of a potential interaction inquiry, not just its responses on such an interaction. For example, this knowledge value could also be based on quantitatively or qualitatively measurable attributes (as collected and synthesized from the participation of other agents) such as (but not limited to): the interaction inquiry's content's evaluated conciseness, comprehensiveness, correctness, and the like. Additionally, other attributes could be the consistency of the responses generated by different agents of the system, the efficiency of the agent in creating the content object on the system, the level of information compressed into the content object (that allows other agents to get to relevant, accurate, or otherwise value-generating responses sooner), and the like.

The knowledge server 220 may evaluate the responses from agent A and agent B, the efficiency in which the responses were provided, previous response histories of the agents, and the like, when determining a knowledge value 234 for each agent. Here, the attributes 232 for efficiency, accuracy, and breadth of knowledge are stored in table 230. Based on these attributes 232, the knowledge server 220 may calculate a knowledge value 234 for each agent and store the agents' information in table 230. In this example, the knowledge server 220 orders the users based on overall knowledge value where a user with a greatest knowledge value (user Z) is listed at the top of the list within the table 230 while the user with the lowest knowledge value (user H) is listed at the bottom of the list. It should also be appreciated that the attributes 232 and the knowledge value 234 may be stored in another/different storage area or device and is not limited to a table or a tabular row/column format, and may be stored, e.g., in a graph- or network-based data structure, protocol, or hardware or a combination thereof.

The agent can interact with the system or its activities and knowledge can be measured by the system. The knowledge value of an agent may be based on, e.g., the agent's efficiency, speed, accuracy, consistency, precision, and breadth of knowledge (among other factors) which may be collectively referred to as measured attributes in a particular area of specialty, expertise, or discipline (e.g., medicine, finance, manufacturing, education, etc.). These are just some examples of the attributes that may be considered by the system in determining knowledge values, but many others exist. These attributes may also be suggested or determined by the system as it analyzes various parameters, dimensions, or other features where agents can be differentiated.

The inquiry or reference set may include a set of questions, cases, hypotheticals, and other content that may be collectively referred to as a case or cases for which the system has measured, captured, and analyzed and for which the system has predefined or otherwise calculated an appropriate response(s) which may include solution(s), answer(s), vote(s), selection(s), diagnosis, or the like. Unlike other tests or systems that measure knowledge, the "questions" and "responses" that are used to test an agent need not be developed by a centralized authority. Instead all or multiple participants in the system may help develop both "questions" and "responses". Furthermore, the depth of the responses may continually evolve as new agents are tested and better responses become available. Each specialty area, area of expertise, or discipline that can be measured by the system may also be the product of interactions between agents in the system rather than developed by a centralized authority (e.g., a self-evolutionary "map" or directory of knowledge areas wherein the relationships between different knowledge areas is measurable and can impact knowledge values).

For example, when the system is measuring an agent's knowledge in the discipline of medicine, a "case" may include a series of findings about a patient, such as "family history of diabetes", "rash on left arm", "severe pain in left arm", or "ear temperature reading of 104 degrees," etc. In this example, a case solution may be the appropriate diagnostic thought process given the content in a particular case, where each additional finding provides an opportunity to understand the diagnosis/diagnoses such as "mycardial infarction", "asthma", "hyperlipidemia," or "hypertension", the appropriate treatment plan ("Aspirin" or "Rosuvastatin"), and/or a recommended set of next tests ("MRI" or "Blood test"). An agent's interaction with a particular case and case solution could relate to or influence the measurable knowledge of the agent along a plurality of specialty areas, areas of expertise, or disciplines, each with different weights or degrees of impact.

The system described herein may derive the inquiry or reference set including cases and case solutions in a distributed manner. For example, the host server may capture data for the cases and the responses to these cases based on interactions with other agents when determining a knowledge value for the respective agents, including the solutions that the agents provide to these cases. As another example, the host server may capture data (including potential responses to cases) proposed by an agent that created the case, an agent that reviewed the case, agents that interact with the case, and the like. Other data sources captured by the system that may influence the reference set (including cases and their responses) include third-party data sources such as literature, references, books, standards, etc., observational tools, transactional data, or the like. As a result, the inquiry and the reference set may be built from data captured from a decentralized group of agents rather than from a centralized authority.

As an illustrative example, in cases where the system is measuring the knowledge value of physicians or other medical professionals, solutions may be derived from information available from an electronic health record platform, medical equipment and medical devices, such as X-ray machines, MRI machines, etc., results of medical tests, such as blood tests, urine samples, etc., direct observation of care via optical, audio, video and other devices, and/or any other data that that may be derived from the care process. The input mechanisms for such information could be, e.g., directly input into the system or collected automatically from other existing systems.

In some embodiments, the interaction between agent and system may be conducted via text readout, audio or video participation by agents, virtual or augmented reality interfaces, or direct manipulation of system hardware.

In some embodiments, solutions (e.g., predefined responses to inquiries proposed by the system) as well as other aspects (such as the name of the source of the information) may be hidden from agents in the system at the outset until the agent has provided its own solution. For example, when presented with a case or other type of inquiry, the agent may not be made aware of other agents that have interacted with the case and will not be aware of solutions provided by other agents. The anonymity among agents that provide inquiries and solutions helps to prevent agents from "gaming" the system. Other protections may also be taken, including using various heuristics, algorithms, heuristics, artificial intelligence/machine learning models, etc., to ensure that an agent is acting in as true to the actual ability as possible. For example, the system may use various methods to catch cheating including, but not limited to, comparing time between a set of responses to a given inquiry, how they reveal information compared to past responses, the current projected ability versus the difficulty of the case, whether other agents have solved the case that the current solving agent knows (e.g., as a friend, colleague, etc.), whether the same agent is using multiple devices and responding in reproducible patterns (e.g., a second device is always correct when a first device is always wrong, etc.), and the like.

In some embodiments, the system described herein may capture a thought process of an agent on the system by revealing information about a case sequentially or in different orders to different agents to understand which piece of information led an agent to arrive at a preferred case solution, or even a poor case solution. This approach allows the system to also measure the efficiency of the agent based on how much information was revealed before the agent provided a response to the inquiry. In some embodiments, the system may request or otherwise capture an agent's incremental attempts to arrive at a case solution after each sequential piece of information is revealed to the agent. In some embodiments, the system may allow the agent to request information from either the system or the source directly in order to capture whether the agent is looking to obtain the right kinds of information for the inquiry.

In some embodiments, a knowledge value of an agent may be calculated with respect to the entire reference set, with respect to a subset of the reference set, or with respect to an entire discipline or field of study or a subset of that discipline or field of study. As another example, the knowledge value may be calculated with respect to the entire reference set but only with respect to one or more of the measured attributes (i.e., knowledge value may be measured solely based on the agent's speed, efficiency, or accuracy separately without aggregating values for those attributes into one overall knowledge value).

In some embodiments, when determining the knowledge value of an agent, the system may consider additional data besides the responses from the agent to specific content objects. As another example, the knowledge value may be determined based on the quality of the item (e.g., content objects of the item, etc.) that the agent formulates and provides to the system. Here, the system may continually evaluate how the items are being interacted upon, possible item solutions, or other inquiries on the host platform by evaluating all or some subset of responses, the agents who have interacted with the item or content object, and the knowledge values of the agents who have interacted with the item or content object. For example, to measure the quality of an item, the system may measure a quality of content or content objects of the item which include information of an inquiry designed to provoke a response from an agent. The system may adjust its solution and recalculate the knowledge value of an agent based on various factors such as location of the agent, context of the agent, periodically, and/or each time a new assessment is provided. In other words, a knowledge value assigned to an agent may be retroactively modified/updated based on interaction of other agents on the system. This may happen each time that an agent interacts with the system (either by creating more cases or case solutions), or they system gains more information in any way, such as by gathering information from other third-party sources (e.g., literature) or equipment (e.g., medical devices). The system may also continually adjust the knowledge value of each agent each time the system acquires more information on the reference set (e.g., cases and case solutions). Trends such as changes in domain-specific practices (which may be captured by the system through interactions with agents or through third-party data sources such as literature, references, books, standards) may also dramatically change metrics on a wide scale.

An example of a future state implementation is provided below. For example, a physician (Physician #1) may log into the system. Based on attributes of Physician #1 such as credentials, academic background, work background, connections, and/or the like, the system may provide cases to Physician #1 to suggest case solutions. For example, the system may identify Physician #1 as a subject matter expert with respect to a particular topic within the discipline of medicine. Therefore, the system may request responses from Physician #1 on inquiries, cases, etc. in that topic. Based on a quality, an accuracy, an efficiency, etc. of case solutions, the system may calculate various knowledge value metrics (knowledge-based metrics) for Physician #1 (and potentially other agents of the system). For example, the system may determine that Physician #1 has an overall knowledge value of 78, a knowledge value of 71 for pediatric dermatology, a knowledge value of 73 for craniofacial pediatric dermatology, an overall efficiency knowledge value of 45, a knowledge value of 88 for efficiency in pediatric dermatology, a knowledge value of 65 for accuracy in craniofacial pediatric dermatology, etc. Within each of these subspecialties, there may be ever more granular dimensions of knowledge value determination, each with quantifiable relationships with other dimensions and each other.

In this example, the case solutions submitted by Physician #1 may affect and change the knowledge values previously assigned to other agents on the system. Likewise, as other agents on the system interact with cases or as the system gathers additional information, the knowledge value assigned to Physician #1 may change dynamically. For example, if a Physician #2 (who has a knowledge value of 99 in pediatric dermatology) on the system provides a case solution for one of the cases in which Physician #1 had previously provided a case solution, and the first case solution is drastically different than the case solution provided by Physician #2, this may decrease Physician #1's knowledge value for pediatric dermatology. For example, if the system gathers information from a sensor (e.g., blood test) in a hospital that can determine, though a high level of accuracy, that a particular patient that is a subject of a case has a specific dermatological diagnosis, agents on the platform who had selected that same diagnosis as part of their case solution may have their knowledge value increased.

As another example, assume the system only had three users on the platform: Physician #1, Physician #2, and Physician #3. Assume that for a specific case (Case #1), Physician #1 and Physician #2 specified the same solution, called "Solution #1". At that time, the system may calculate the optimal solution as "Solution #1" as all of the solutions it has available to it are "Solution #1". At a later time, Physician #3 provides a solution for Case #1 which is different than Solution #1. This solution shall be called Solution #2. Just on this data alone, the system may determine that "Solution #1" is the optimal solution because two users provided "Solution #1" and just one user provided "Solution #2". Additionally, based on this data alone, the system may ascribe a high knowledge value to Physician #1 and Physician #2, but a low value to Physician #3. At some later time, after providing many additional optimal solutions to the platform, the system may ascribe a higher knowledge value to Physician #3. At that time, the system may also reevaluate the optimal solution to Case #1 and ascribe Solution #2 as the optimal solution given the current greater knowledge value of Physician #3. This change in the optimal solution of Case #1 may now further decrease the knowledge value of Physician #1 and Physician #2, as they have now provided a suboptimal value to Case #1. This process of reevaluating knowledge values and case solutions are constantly done by the system.

In another example, Physician #1 and Physician #2 may disagree on case solutions, but the aggregate of interactions between each physician and the system may reveal that Physician #1 has more consistently optimal responses to case solutions based on the dynamically determined optimal responses (i.e. dynamically defined solution) to case solutions that relate to pediatric dermatology. This may result in the responses of Physician #1 and #2 having disparate and widely interrelated impact on many different case solutions' dynamically defined solutions, which in turn may further impact the knowledge values attributed to each physician, and so on. In effect, a large number of dynamically defined solutions and knowledge values of agents may have an even larger number of relationships with one another that are constantly affecting one another (e.g., distributed among a plurality of a multidimensional feedback loops). Even on a small scale, the complexity and sheer number of these interactions and changes to dynamically defined solutions and knowledge values are unique to the computing arts and have previously been unattainable. Such solutions and values are able to be modified and self-corrected at ever increasing rates and with ever increasing numbers of dimensions and categories of knowledge values (e.g., more and more granular disciplines or dimensions of knowledge). Such interactions and changes may also occur without the intervention of any human agents; for example, validation data may be continuously and automatically collected by the system from a plurality of sources, including but not limited to sources in external data stores, sensors connected with agents, medical records, and academic research.

In some embodiments, the knowledge value of an agent may be determined on an agent-by-agent basis and on a case-by-case basis. This means that, for example, an agent's overall knowledge value may be the average of the knowledge value for each case the agent provides a case solution(s) for. In one embodiment, the determination of the agent's overall knowledge value may involve the system measuring the accuracy, efficiency, and breadth of knowledge agent. For example, accuracy may be determined by comparing the agent's case solution(s) to a particular case with the case solution(s) proposed by the agent who created the case or the case solutions(s) proposed by others uses of the system. Efficiency may be generated by determining how much information the agent requested or asked the system for about a particular case before arriving at an accurate case solution(s). Breadth may be generated by determining how many case solution(s) that the agent provides for a particular case and the most popular case solutions provided by other agents of the system. Each of these three factors may be calculated as a percentage (compared to case solutions provided by other agents on a particular case). As a non-limiting example, if 10 agents provide a case solution for a particular case, where 2 agents are able to provide an optimal case solution with 2 pieces of information, 7 agents are able to provide an optimal case solution with 5 pieces of information, and one agent is able to provide an optimal case solution with 3 pieces of information, the agent who provided the optimal case solution with 3 pieces of information may be assigned a knowledge value of 70.

In some embodiments, knowledge value determination and the inquiry and/or response protocol may be engineered to expand the knowledge of the agent by the information provided in the inquiry, the interaction of the agent with the system, feedback to the interaction provided by the system, or the like. For example, customized information, interactive content, machine-readable feedback, or live decision support (any of which may vary based on the knowledge values of the agent) may be provided by the system to expand an individual agent's knowledge. In some embodiments, the system may determine a synthesis of the knowledge values of agents, inquiries, responses, and their respective properties to refine knowledge about particular disciplines or data sets, which may further impact the dynamically defined solution for one or more inquiries. For example, the system may, without the specific involvement of any agent, determine by analysis and synthesis of existing knowledge values of agents and their interactions with the system that adjustments to dynamically defined solutions are needed within or across a set of inquiries or a knowledge dimension or discipline. The system may also identify other agents to complement or weigh in on the knowledge provided from an agent.

Figure 3:
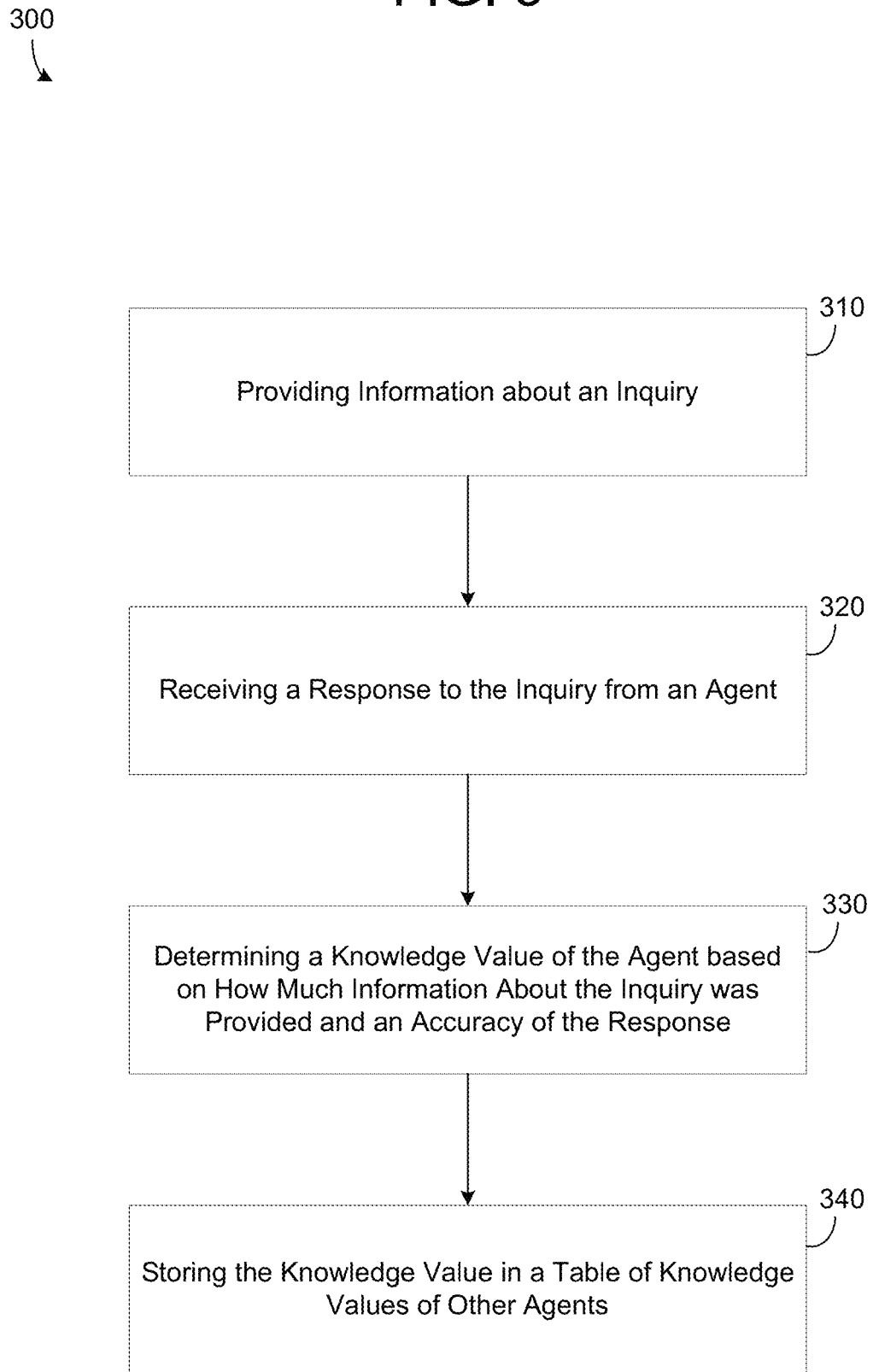
FIG. 3 is a diagram illustrating a method of determining a knowledge value in accordance with an example embodiment.

FIG. 3 illustrates a method 300 for determining a knowledge value of an agent in a discipline-specific domain, in accordance with example embodiments. For example, the method 300 may be performed by a web server, a host platform, a cloud platform, a database, and/or the like. In some embodiments, the method may be performed by a host server of a mobile application, however, embodiments are not limited thereto. Referring to FIG. 3, in 310, the method to have the agent obtain information about an inquiry can be done via a computing device of some kind, and for example, the information may be sequentially revealed. Each sequence may include steps, segments, windows, etc., of data about a situation, scenario, fact pattern, inquiry, problem, or the like. The sequential revealing of information may be uninterrupted, in that if a response is not received from the agent, the system may automatically output the next step, etc. In some embodiments, the inquiry may include a reference set of questions associated with a test case. As another example, the inquiry may include questions around a fact pattern from an active case.

In 320, the method may include receiving, via the computing device, a response to the inquiry which includes a determination by an agent. The response may include one or more words, phrases, sentences, paragraphs, and the like, of textual data. In some embodiments, the system may receive other data from the agent such as speech, audio, video, virtual or augmented reality, and other forms of online or offline content. In some embodiments, the system may convert the audio to text but this is not required. In 330, the method may include determining a knowledge value for the agent based on how much information about the inquiry has been revealed and an accuracy of the determination with respect to a dynamically defined solution for the inquiry. Here, the response provided by the agent may be compared to a predefined response (or dynamically defined solution based on other agents' responses) to determine a closeness with the response, or otherwise determine how optimal or correct the response is. In 340, the method may include storing the determined knowledge value of the agent within a table including determined knowledge values of other agents in a same discipline.

In 310, the sequentially revealing step may include incrementally outputting attributes of the inquiry via a display screen. In 330, the determining step may include determining a greater knowledge value for the agent in response to an amount of information revealed to the agent being less than a dynamic average of information revealed to other agents. As another example, the determining step may include determining a lower knowledge value for the agent in response to an amount of information revealed to the agent being less than a dynamic average of information revealed to other agents. In some embodiments, the knowledge value may be further determined based on previous responses of the agent to previous inquiries. In some embodiments, the method may further include modifying a previously determined knowledge value for the agent associated with one or more previous inquiries based on the determined knowledge value and storing the modified knowledge value within the table. As described herein, the agent may be a software program running on a machine.

The above embodiments may be implemented in hardware, in a computer program executed by a processor, in firmware, or in a combination of the above. A computer program may be embodied on a computer readable medium, such as a storage medium or storage device. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

A storage medium may be coupled to the processor such that the processor may read information from, and write information to, the storage medium. In an alternative, the storage medium may be integral to the processor. The processor and the storage medium may reside in an application specific integrated circuit ("ASIC"). In an alternative, the processor and the storage medium may reside as discrete components. For example, a computing system may represent or be integrated in any of the above-described components, etc. That is, the computing system is capable of being implemented and/or performing any of the functionality set forth hereinabove.

Figure 4:
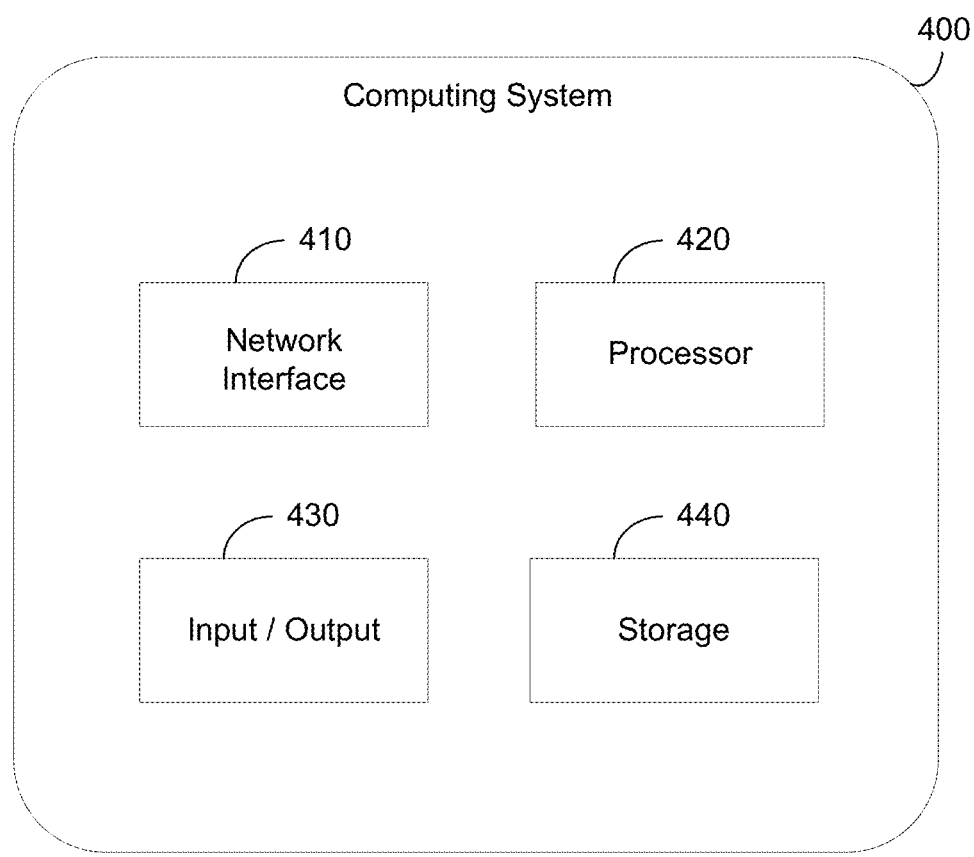
FIG. 4 is a diagram illustrating a computing system for use in the examples herein in accordance with an example embodiment.

FIG. 4 illustrates a computing system 400 that may be used in any of the methods and processes described herein, in accordance with an example embodiment. For example, the computing system 400 may be a database node, a server, a cloud platform, a user device, an agent system, or the like. In some embodiments, the computing system 400 may be distributed across multiple computing devices such as multiple database nodes. Referring to FIG. 4, the computing system 400 includes a network interface 410, a processor 420, an input/output 430, and a storage device 440 such as an in-memory storage, and the like. Although not shown in FIG. 4, the computing system 400 may also include or be electronically connected to other components such as a microphone, a display, an input unit(s), a receiver, a transmitter, a persistent disk, and the like. The processor 420 may control the other components of the computing system 400.

The network interface 410 may transmit and receive data over a network such as the Internet, a private network, a public network, an enterprise network, and the like. The network interface 410 may be a wireless interface, a wired interface, or a combination thereof. The processor 420 may include one or more processing devices each including one or more processing cores. In some examples, the processor 420 is a multicore processor or a plurality of multicore processors. Also, the processor 420 may be fixed or it may be reconfigurable. The input/output 430 may include an interface, a port, a cable, a bus, a board, a wire, and the like, for inputting and outputting data to and from the computing system 400. For example, data may be output to an embedded display of the computing system 400, an externally connected display, a display connected to the cloud, another device, and the like. The network interface 410, the input/output 430, the storage 440, or a combination thereof, may interact with applications executing on other devices.

The storage device 440 is not limited to a particular storage device and may include any known memory device such as RAM, ROM, hard disk, and the like, and may or may not be included within a database system, a cloud environment, a web server, or the like. The storage 440 may store software modules or other instructions which can be executed by the processor 420 to perform the methods and processed described herein. In various examples, the storage 440 may include a data store having a plurality of tables, partitions and sub-partitions. The storage 440 may be used to store database records, items, entries, and the like. Also, the storage 440 may be queried using SQL commands.

The computing system may include a computer system/server, which is operational with numerous other general purpose or special purpose computing system environments or configurations. Examples of well-known computing systems, environments, and/or configurations that may be suitable for use as computing system include, but are not limited to, personal computer systems, cloud platforms, server computer systems, thin clients, thick clients, hand-held or laptop devices, tablets, smart phones, databases, multiprocessor systems, microprocessor-based systems, set top boxes, programmable consumer electronics, network PCs, minicomputer systems, mainframe computer systems, distributed cloud computing environments, and the like, which may include any of the above systems or devices, and the like. According to various embodiments described herein, the computing system may be a web server.

The computing system may be described in the general context of computer system-executable instructions, such as program modules, being executed by a computer system. Generally, program modules may include routines, programs, objects, components, logic, data structures, and so on that perform particular tasks or implement particular abstract data types. The computing system may be practiced in distributed cloud computing environments where tasks are performed by remote processing devices that are linked through a communications network. In a distributed cloud computing environment, program modules may be located in both local and remote computer system storage media including memory storage devices.

The computing system is shown in the form of a general-purpose computing device. The components of computing system may include, but are not limited to, a network interface, one or more processors or processing units, an input/output which may include a port, an interface, etc., or other hardware, for inputting and/or outputting a data signal from/to another device such as a display, a printer, etc., and a storage device which may include a system memory, or the like. Although not shown, the computing system may also include a system bus that couples various system components including system memory to the processor. In some embodiments, the input/output may also include a network interface.

The storage may include a variety of computer system readable media. Such media may be any available media that is accessible by computer system/server, and it may include both volatile and non-volatile media, removable and non-removable media. System memory, in one embodiment, implements the flow diagrams of the other figures. The system memory can include computer system readable media in the form of volatile memory, such as random access memory (RAM) and/or cache memory. As another example, storage device can read and write to a non-removable, non-volatile magnetic media (not shown and typically called a "hard drive"). Although not shown, a magnetic disk drive for reading from and writing to a removable, non-volatile magnetic disk (e.g., a floppy disk, etc.), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, storage device may include at least one program product having a set (e.g., at least one) of program modules that are configured to carry out the functions of various embodiments of the application.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Although not shown, the computing system may also communicate with one or more external devices such as a keyboard, a pointing device, a display, etc.; one or more devices that enable an agent to interact with computer system/server; and/or any devices (e.g., network card, modem, etc.) that enable computing system to communicate with one or more other computing devices. Such communication can occur via I/O interfaces. Still yet, computing system can communicate with one or more networks such as a local area network (LAN), a general wide area network (WAN), and/or a public network (e.g., the Internet) via network interface. As depicted, network interface may also include a network adapter that communicates with the other components of computing system via a bus. Although not shown, other hardware and/or software components could be used in conjunction with the computing system. Examples include, but are not limited to: microcode, device drivers, redundant processing units, external disk drive arrays, RAID systems, tape drives, and data archival storage systems, etc.

It will be readily understood that descriptions and examples herein, as generally described and illustrated in the figures, may be arranged and designed in a wide variety of different configurations. Thus, the detailed description of the embodiments is not intended to limit the scope of the application as claimed but is merely representative of selected embodiments of the application. One of ordinary skill in the art will readily understand that the above may be practiced with steps in a different order, and/or with hardware elements in configurations that are different than those which are disclosed. Therefore, although the application has been described based upon some preferred embodiments, it would be apparent to those of skill in the art that certain modifications, variations, and alternative constructions would be apparent.

What is claimed is:

1. A method comprising:
   displaying, via a server, an interactive display screen of a software application hosted by the server;
   sequentially revealing attributes from a set of attributes associated with an inquiry via the interactive display screen of the software application, wherein the server incorporates a period of time for a response via the interactive user interface after revealing an attribute of the set of attributes and before revealing a next attribute from the set of attributes;
   receiving, from a user computing device, a formulation of content that corresponds to the inquiry input via the interactive display screen of the software application;
   identifying how many additional attributes from the set of attributes were revealed to the user computing device by the software application before receiving the formulation of content from the user device;
   determining an accuracy of the formulation of content based on a comparison of the formulation of content to a defined response for the inquiry;
   determining a knowledge value for a user corresponding to the user device based on how many attributes from the set of attributes were revealed and the accuracy of the formulation of the content from the user; and
   storing the determined knowledge value of the user within a storage device.

2. The method of claim 1, wherein determining the knowledge value for the user is based on an order in which the additional attributes about the inquiry are revealed.

3. The method of claim 1, wherein the revealing comprises revealing incremental attributes of the inquiry in a dynamically determined order via the display screen.

4. The method of claim 1, wherein the knowledge value is further determined based on previous responses of the user to previous inquiries.

5. The method of claim 1, further comprising modifying a previously determined knowledge value for the user based on subsequent responses to inquiries by the user and storing a modified knowledge value within the storage device.

6. The method of claim 1, further comprising modifying a previously determined knowledge value for the user based on responses from other user and storing a modified knowledge value within the storage device.

7. The method of claim 1, further comprising modifying knowledge values for users based relational attributes among a plurality of disciplines.

8. The method of claim 1, further comprising modifying a previously determined knowledge value for the user based on information about the user that is obtained without the user interacting with an input of the user device.

9. The method of claim 8, where the information about the user that is obtained from the user device comprises information obtained from one or more of a video camera, a computing device, and a sensor of the user device.

10. The method of claim 1, wherein the user comprises a software program running on the user device.

11. The method of claim 1, wherein the inquiry comprises a reference set of questions.

12. The method of claim 1, wherein the inquiry comprises a fact pattern.

13. The method of claim 1, wherein the inquiry comprises information submitted by another user.

14. The method of claim 1, further comprising categorizing user interaction with the user device into a discipline from among a plurality of disciplines.

15. The method of claim 1, wherein the defined response for the inquiry is determined based on historical user interactions with the user device.

16. The method of claim 1, where the processor is configured to determine the accuracy of the formulation of content with respect to a dynamically defined solution for the inquiry which is determined based on a known relationship between inquiries.

17. The method of claim 16, wherein the known relationship between inquiries comprises statistical information about relatedness determined automatically by the user device.

18. The method of claim 1, further comprising synthesizing the formulation of content from the user with a formulation of content from another user based on the determined knowledge value of the user and a knowledge value of the other user.

19. The method of claim 1, further comprising modifying a previously determined knowledge value for the user in the storage device in response to changing knowledge values of other users who provided responses to the inquiry.

20. The method of claim 1, wherein the method further comprises dynamically determining the defined response for the inquiry based on response content received from one or more other users who previously provided a response to the inquiry.

21. The method of claim 1, wherein the method further comprises dynamically modifying a knowledge value previously generated for another user based on the determined knowledge value for the user, and replacing the knowledge value within the storage device with the modified knowledge value.

* * * * *